(12) United States Patent
Sallis, Sr.

(10) Patent No.: US 9,370,977 B2
(45) Date of Patent: Jun. 21, 2016

(54) TRAILER STEERING APPARATUS AND METHOD

(71) Applicant: Daniel Virgil Sallis, Sr., Englewood, CO (US)

(72) Inventor: Daniel Virgil Sallis, Sr., Englewood, CO (US)

( * ) Notice: Subject to any disclaimer, the term of this patent is extended or adjusted under 35 U.S.C. 154(b) by 0 days.

(21) Appl. No.: 14/606,107

(22) Filed: Jan. 27, 2015

(65) Prior Publication Data

US 2015/0210131 A1     Jul. 30, 2015

Related U.S. Application Data

(60) Provisional application No. 61/932,684, filed on Jan. 28, 2014.

(51) Int. Cl.
*B60D 1/24* (2006.01)
*B62D 13/02* (2006.01)

(52) U.S. Cl.
CPC ............. *B60D 1/24* (2013.01); *B62D 13/025* (2013.01)

(58) Field of Classification Search
CPC ........ B60D 1/24; B60D 13/025; B60D 53/06; B60D 13/02
See application file for complete search history.

(56) References Cited

U.S. PATENT DOCUMENTS

| 1,414,343 | A | * | 5/1922 | Doe | B62D 13/02 |
| | | | | | 280/140 |
| 1,416,613 | A | * | 5/1922 | Colardeau | B62D 13/02 |
| | | | | | 280/419 |
| 2,702,193 | A | * | 2/1955 | Copeman | A01B 69/006 |
| | | | | | 172/28 |
| 2,869,888 | A | * | 1/1959 | Burger | B60P 3/40 |
| | | | | | 280/101 |
| 3,246,714 | A | * | 4/1966 | Middlesworth | B62D 13/00 |
| | | | | | 180/14.1 |
| 3,294,418 | A | * | 12/1966 | Middlesworth | B62D 13/00 |
| | | | | | 280/406.1 |
| 4,106,794 | A | | 8/1978 | Sallis | |
| 4,171,825 | A | | 10/1979 | Woodell | |
| 5,171,035 | A | * | 12/1992 | Brown | B62D 53/005 |
| | | | | | 280/426 |
| 5,477,937 | A | | 12/1995 | Chagnon | |
| 6,152,475 | A | | 11/2000 | Poole | |
| 6,735,507 | B2 | | 5/2004 | Grougan et al. | |
| 7,134,829 | B2 | | 11/2006 | Quenzi et al. | |
| 7,137,641 | B1 | * | 11/2006 | Lipsey, III | B62D 13/02 |
| | | | | | 280/408 |
| 7,497,457 | B2 | | 3/2009 | Jamieson | |

(Continued)

FOREIGN PATENT DOCUMENTS

EP     1716754      11/2006
WO    WO 00/27179    5/2000

OTHER PUBLICATIONS

"Demco KK370SB Kar Kaddy 3 Car Tow Dolly with Surge Brakes," Demco Manufacturing Co., 2015, retrieved from http://www.demcotowbars.com/demco-kk370sb-kar-kaddy-3-car-tow-dolly-with-surge-brakes/?page_context=category&faceted_search=0, 2 pages.

(Continued)

*Primary Examiner* — Joseph Rocca
*Assistant Examiner* — Gabriela C Craciun
(74) *Attorney, Agent, or Firm* — Sheridan Ross P.C.

(57) ABSTRACT

Apparatus and methods are provided to eliminate transient swaying of a towed vehicle imparted upon the towed vehicle during a towing operation by decoupling the towing and towed vehicles rotationally from each other. In one embodiment this is accomplished through the use of a doubly hinged tow bar and to steer the towed vehicle based upon the relative angular deflections of the two vehicles while subtracting out transient rotations of the towing vehicle.

7 Claims, 8 Drawing Sheets

(56) References Cited

U.S. PATENT DOCUMENTS

| | | | |
|---|---|---|---|
| 7,823,902 B2 | 11/2010 | Jamieson | |
| 8,042,825 B2 | 10/2011 | Jamieson | |
| 8,132,999 B2 | 3/2012 | Lundin | |
| 8,919,803 B2 | 12/2014 | Jamieson | |
| 2001/0054524 A1 | 12/2001 | Masters et al. | |
| 2012/0241229 A1* | 9/2012 | Niva | B60K 6/46 180/14.2 |
| 2013/0179038 A1* | 7/2013 | Goswami | B62D 13/005 701/42 |
| 2014/0277941 A1* | 9/2014 | Chiu | B62D 13/06 701/41 |
| 2014/0300082 A1* | 10/2014 | Szabo | B60D 5/00 280/492 |
| 2015/0014961 A1* | 1/2015 | Struyk | B60D 1/173 280/419 |

OTHER PUBLICATIONS

"Demco KK460SS Kar Kaddy SS Car Tow Dolly with Surge Brakes," Demco Manufacturing Co., 2015, retrieved from http://www.demcotowbars.com/demco-kk460ss-kar-kaddy-ss-car-tow-dolly-with-surge-brakes/?page_context=category&faceted_search=0, 2 pages.

"Demco KKLB Kar Kaddy Tow Car Auxiliary Light Bar," Demco Manufacturing Co., 2015, retrieved from http://www.demcotowbars.com/demco-kklb-kar-kaddy-tow-car-auxiliary-light-bar/?page_context=category&faceted_search=0, 2 pages.

"EZE-TOW Tow Dolly," ACME Tow Dolly Co., 2015, retrieved from http://cartowdolly.com/, 4 pages.

Hest, "By Wheel or by Wire?," Farm Industry News, Aug. 1, 2007, retrieved from http://farmindustrynews.com/wheel-or-wire.com, 2 pages.

"How to Eliminate Trailer SwayTM," Rev. 1.0, Hensley Mfg., Inc., 2011, 5 pages.

"Steering simplified for tractors, combines, application rigs and more," Ag Leader®, Jun. 10, 2013, retrieved from http://web.archive.org/web/20130610141820/www.agleader.com/products/guidance-steering/ontrac2/, 3 pages.

"The Automated Safety HitchTM," Automated Safety Hitch, Inc., 2007-2015, retrieved from www.automatedsafetyhitch.com/, 3 page.

International Search Report and Written Opinion for International (PCT) Patent Application No. PCT/US2015/013203, mailed May 8, 2015 10 pages.

* cited by examiner

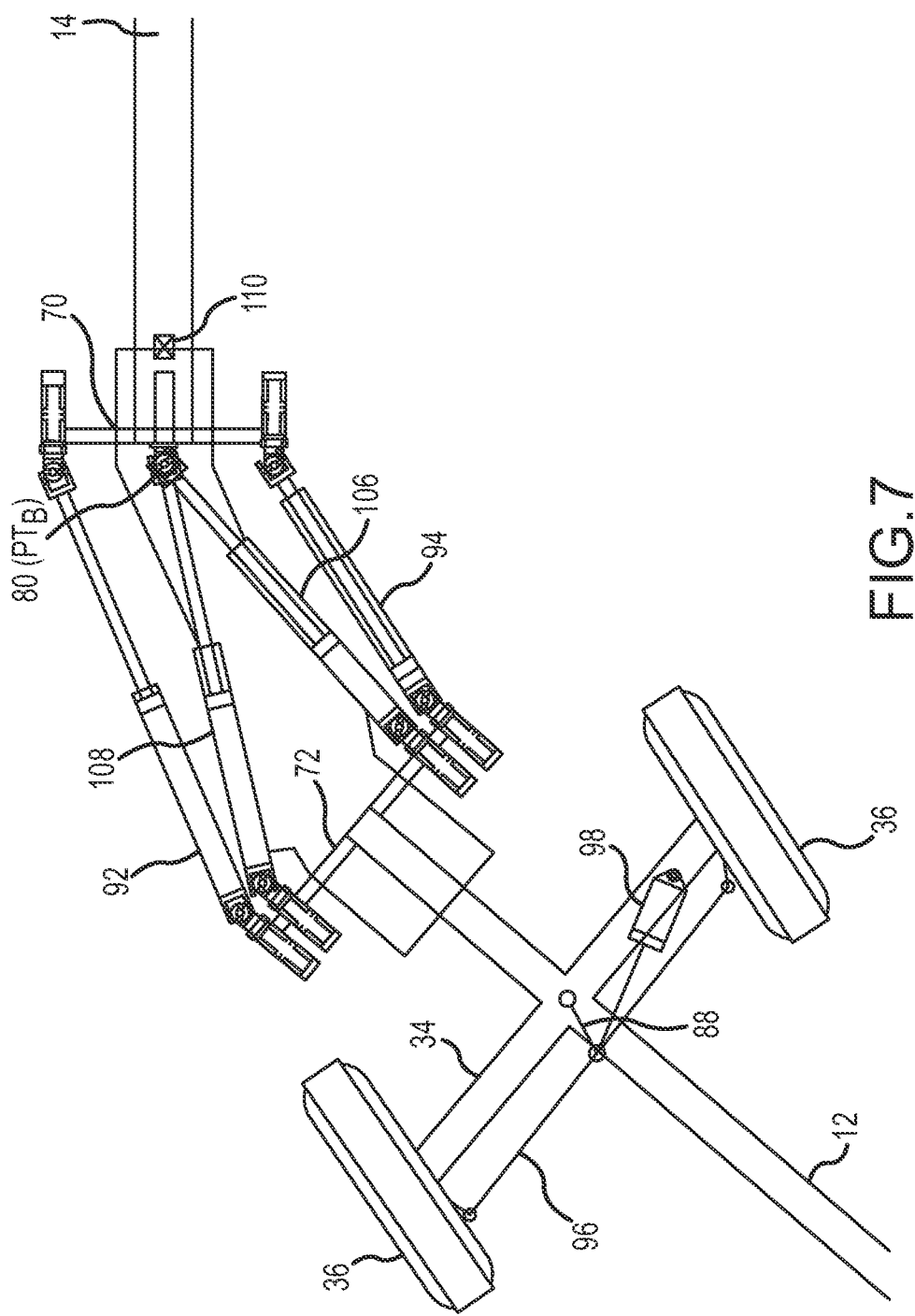

TRAILER STEERING APPARATUS AND METHOD

CROSS-REFERENCE TO RELATED APPLICATIONS

The present application claims the benefit of U.S. Provisional Application Ser. No. 61/932,684, filed Jan. 28, 2014, the entirety of which is incorporated herein by this reference.

FIELD OF THE INVENTION

This invention provides a means to hitch a towed trailer or vehicle, to the rear of a typical towing vehicle with stability equal to or greater than a typical fifth-wheel type connection. The invention also incorporates a means to offset the towed vehicle's path to a larger radius from that for a typical fifth wheel trailer such that the towed vehicle tracks more in-line with the towing vehicle.

BACKGROUND

Trailers are typically hitched at the very rear of a towing vehicle for convenience. However that connection point is subjected to significant and essentially instantaneous changes in the direction and the magnitude of the local velocity vector whenever the towing vehicle is steered to a new path radius. The sudden change in direction of the hitch point, either in pitch or sway or both, is serious since it is out of sync with the actual changes in direction of the towing vehicle. The result is a transient phase where the towed vehicle first changes in the opposite direction from the towing vehicle and then must change its direction at least two more times to merge with the new path of the towing vehicle. Thus the towed vehicle goes through a zigzag motion in order to move over and get in-line with a new towing path. Dynamically the adjustment can take multiple cycles and easily lead to developing a swerve or swaying motion, which, in turn, can lead to loss of control and/or an accident.

Historically trailers for automotive vehicles grew out of approaches used for wagons pulled by animals which were influenced obviously by the need to reduce or virtually eliminate the down load on the pulling animals. Thus the typical heavily loaded wagon utilized an axle at its front and rear with the front axle steered by tracking the animal's path.

That arrangement worked well for the early versions of motor vehicles and was commonly used in the 1940's and was effective for the light motor vehicles of that time. However the steering on those trailers was not very well implemented and they typically tended to sway even at slow city speeds and were not used for highway type travel; and were soon phased out. Short dolly hitches for a rear bumper connection were also tried as a means to alleviate the down load on those early cars. However they were pretty much a disaster and immediately discontinued because the dolly's short wheel base was very sensitive to the rear mounted hitch's zigzag motion.

The popular equalizer hitch moves the down load of the trailer forward by applying a spring-loaded moment to the towing vehicle. Thus by relieving the de-stabilizing up load on the towing vehicle's front axle it tends to preserve the towing vehicle's handing to the extent that an experienced driver can tolerate a properly balance towed trailer.

Hitch manufacturers have attempted to reduce the effects of the swaying motion of rear mounted hitched trailers with various energy absorbing devices at the connection to the towing vehicle. However the zigzag path of the rear-mounted hitch is not eliminated for a single point hinged connection aft of the towing vehicle's rear axle and with a friction energy absorbing device it is difficult to take out enough energy without deteriorating the maneuvering ability of the vehicles.

U.S. Pat. No. 4,106,794 ("the '794 patent"), the entirety of which is incorporated herein by reference, is one attempt to control pitch and sway. In one embodiment, a multi-bar linkage towing system attached to the rear of a towing vehicle aft of the rear axle is designed to emulate a fifth wheel attachment. The linkage system is designed for use with non-specialized towing vehicles, such as passenger cars, where a traditional fifth wheel system cannot be implemented. The linkage system comprises multiple tow bars positioned vertically and laterally of each other which, due to their orientation, create a virtual pivot point at the center of the rear axle of the towing vehicle.

This linkage shifts the trailer loads applied at the rear bumper of the towing vehicle forward mechanically to its rear axle without the use of spring bars as is used in the present popular equalizer hitches and thus it is not dependent on preloaded springs or their deflection, only the applied load. In addition, the mechanism of the '794 patent shifts the lateral trailer side loads forward in the same manner and this also significantly stabilizes the towing and towed vehicle combination. The '794 patent mechanism simulates fifth-wheel towing, moves both the vertical and lateral loads forward with its mechanical linkage and accomplishes these advantages without the use of adjustable springs. The difficulty with this mechanism is that it essentially simulates a fifth wheel hitch implementing fifth-wheel towing benefits but with some of the undesirable fifth-wheel disadvantages such as cutting the corner on sharp turns. One of the negative characteristics of present typical fifth-wheel hitch towed vehicles is that, the towed vehicle turns at a much sharper radius than the towing vehicle because of the typical location of the towed vehicle relative to the towing vehicle's rear axle. Thus the typical fifth-wheel towed vehicle significantly cuts sharp corners typical of city intersections.

A corner-cutting solution now provided by some fifth-wheel hitch systems is to move the fifth-wheel hitch point aft for city driving and then move it back forward for the higher speed roadways. The significance of this is to trade-off the stable fifth-wheel connection location for less stability and more corner clearance where the typical speed is much slower. This is fairly acceptable considering that safe city cornering speeds for these types of trailer vehicles are much slower than even normal city traffic. However, of critical consideration here is that typical speeds for city driving in many cases are in the 30 to 50 miles per hour range where lateral stability should be provided. Thus the location-shifting should be done essentially for each corner or at least moved back to its stable position when the expected speeds increase.

Another example of efforts to emulate a fifth-wheel type trailer connection is described in U.S. Pat. Nos. 7,497,457, 7,823,902 and 8,042,825. The towing system described in these patents is designed for use with gooseneck-type trailers that utilize fifth wheel-type attachments. The system includes an accessory towing apparatus, which is attached to the towing vehicle and effectively extends the towing vehicle's wheelbase for purposes of enhancing stability and control. The accessory towing apparatus comprises a chassis with two wheels and two linkage arms extending forward from the accessory towing apparatus to engage the towing vehicle. The axle assembly is comprised of ground engaging wheels having a fixed alignment or a dynamically induced alignment. Thus they are essentially castor-mounted wheels, which can in one case be locked in alignment or in a second case set free to swivel dynamically. The first case is proposed for use at high speeds with the wheels fixed and allows only a slight swivel motion. Thus the towing vehicle is restricted in its lateral motion and this supposedly stabilizes the towing and towed vehicle combination. At slow speeds the axle assembly enables the wheels to pivot up to 31 degrees thus permitting the vehicles wheel's to castor and be maneuvered. The concept is to lock the castored wheels for stability and to unlock them to allow the towing vehicle to maneuver.

The problem foreseen with such an approach is that a castored wheel steers itself dynamically because it has no lateral resistance to swiveling and thus it tracks dynamically in the direction in which it is pushed. Thus a freely castored wheel cannot provide any lateral support to improve the lateral stability. Whenever these support wheels are un-locked, to swivel even a small amount, there is no lateral stability for the extended hitch position and the towing vehicle becomes very unstable, much more so than if the hitch were at the rear bumper. Plus any attempt to maneuver with the swivels locked will be aggravated by the requirement that to maneuver laterally for the locked case one or more of the three axles on the ground will have to slide laterally. The result is the handling and stability of the so coupled vehicles at any given time will depend on which axles are sliding and to what degree. Thus both the locked and unlocked cases will present stability and handling risks.

SUMMARY

A primary objective of embodiments of the present invention is to provide a hitch connection that isolates the transient steering caused rotational oscillations of the towing vehicle from imposing and exciting a swaying motion of the towed vehicle. And where possible, improve the corner clearance typical of city intersections and parking lot maneuvering. Embodiments of the present invention significantly reduce, if not eliminate, the imposition of the transient zigzag motion, e.g., lateral swaying, on a towed vehicle by decoupling the towing and towed vehicles rotationally from each other and by steering the front axle wheels of the towed vehicle as a function of the lateral deflections at both these pivot points.

Embodiments of the present invention, described herein, utilize an approach to simulate fifth wheel type stability with the addition that the towed vehicle's track is off-set to align it more accurately and correctly with the line of the towing vehicle so the towed vehicle will not cut the corner as much as typical fifth-wheel hitch systems, which is an improvement over the embodiments described in the '794 patent. In addition, embodiments of the present invention are similar to a fifth-wheel in that the towed vehicle can also deflect laterally up to 90 degrees for sharp corner and parking maneuvering. Thus the embodiments of the present invention are a significant improvement over the '794 patent in that they have similar stability but with substantially improved maneuverability.

A preferred approach is to provide a second lateral pivot point at the towed vehicle, which is in addition to the present lateral pivot at the hitch point typical for a fifth-wheel trailer or a typical trailer hitched to the rear of the towing vehicle. That is, to utilize a tow bar pivoted both at the towing vehicle end and the towed vehicle end such that each vehicle can rotate laterally independently of such tow-bar. Thus the lateral oscillations of each vehicle will essentially be isolated from the other.

Embodiments of the present invention are based on the realization that to stabilize a towed vehicle attached at the rear of a towing vehicle, the towed vehicle must be disconnected or isolated from the lateral transient angular motions a towing vehicle utilizes to change the radius of its path particularly as when the towing vehicle makes typical lane changes at highway speeds.

The requirement for stability is preferably accomplished without extending the effective wheelbase of the towed vehicle. Thus the preferred embodiment provides a simple way of translating the stable fifth wheel track to a new position created at the rear tow bar pivot attachment point to the towed vehicle. In this manner the towed vehicle tracks effectively as a fifth wheel trailer with its corresponding original wheel base hitched at this new stable point at the rear of the tow bar.

Another improvement provided by embodiments of the present invention is that the front of the towed trailer is supported with wheels and that they are steered directly by a mechanism per equations 1 thru 4. In this manner the towed trailer's stability is always equal to that of a normally connected similar fifth-wheel trailer. And, there are no periods of trailer instability and the towing vehicle is always fully maneuverable.

In one embodiment, the steering process is changed such that the towed vehicle's wheels are not only steered by the angle the tow bar makes with the towed vehicle, but also the angular deflection of the towing vehicle relative to the tow bar is determined to subtract out the transient rotations or instability of the towing vehicle. More specifically, in a preferred embodiment, the arrangement is to: i) utilize a tow bar that is laterally free to pivot at both its forward attachment to the towing vehicle and at its aft attachment to the towed vehicle; and ii) steer the towed vehicle's wheels proportional to the sum of (a) the lateral angular deflection at the tow bar's aft connection (for example, angle Phi "φ" in FIG. 1) and (b) the product of a factor (Kb) times the tow bar's forward lateral angular deflection (angle Theta "θ" in FIG. 1). See Eq. 1 for Kb.

In addition, this arrangement includes a factor, Ka (see Eq.2), to offset the towed vehicle's path to a larger radii to locate it more in-line with the path of the towing vehicle and a third factor, Kc (see Eq.3), to correct for the case when it is desirable to locate the aft pivot of the tow bar a distance forward of the towed vehicle's steered axle.

Thus, in a preferred embodiment, the towed vehicle's steering takes the form of the following Equations 1 thru 4 and Steps 1 thru 3. Its physical arrangement is shown in FIG. 1.

$Kb=a/(a+b)$; this addresses the oscillation of the towing vehicle.      Eq. 1

$Ka=1-a/(a+c)$; this offsets the path of the towed vehicle.      Eq. 2

$Kc=(c-c')/c$; this addresses a forward location of the towed hitch point.      Eq. 3

$Alpha=-Ka*Kc*x-(phi+(Kb*theta))$; this provides steer angle for the towed vehicle's steered wheels.      Eq. 4

Step 1. Set-up: Determine the factors Ka, Kb, and Kc based on the actual geometry of the specific vehicles and the tow hardware. As should be appreciated, the value of the K factors may vary depending upon the particular hardware implementation of a steering system. However, the basic functions of the K factors are: to define the location of the towing vehicle's local center of rotation (Kb); transpose that stability to a convenient location behind the towing vehicle (Ka); and account for the effective wheel base of the towed vehicle (Kc).

Step 2. Operational: Constantly Measure the angles theta ($\theta$) and phi ($\phi$); that is the angles of the tow bar relative to the towing vehicle, and the angle of the tow bar relative to the towed vehicle, respectively.

Step 3. Operational: Determine and set the towed vehicle's instantaneous steering angle alpha ($\alpha$) per Eq. 4.

The following definitions apply with respect to the above-related equations and steps, and are illustrated in FIG. 2.

Length Distances or Dimensions (D):
Da=Towing vehicle's rear overhang distance from RMin-Point to tow bar pivot. This is shown in FIG. 1 as $D_a$.
Db=Tow bar's virtual length between front to rear pivots. This is shown in FIGS. 1 and 5 as $D_b$.
Dc=Distance from tow bar's rear pivot to towed vehicle's rear axle. This is shown in FIG. 1 as $D_c$.
Dc'=Set back of towed steered axle from tow bar to towed vehicle's connection. This is shown in FIG. 1 as $D_{c'}$.

Points (Pt):
A=Towing vehicle's local rotational center. This is shown in FIG. 1 as $Pt_A$.
B=Forward hitch point of the tow bar. This is shown in FIG. 1 as $Pt_B$.
C=Rear hitch point of the Tow Bar. This is shown in FIG. 1 as $Pt_C$.
C'=Center of Towed steered Axle. This is shown in FIG. 1 as $Pt_{C'}$. Although depicted rearward of $Pt_C$, $Pt_{C'}$ may be positioned forward of $Pt_C$.
D=Center of Towed rear axle. This is shown in FIG. 1 as $Pt_D$.

Tow Bar Angles
Theta ($\theta$)=Instantaneous angular deflection of tow bar relative to towing vehicle.
Phi ($\phi$)=Instantaneous angular deflection of tow bar relative to towed vehicle.
Alpha ($\alpha$)=Steer angle of the towed vehicle.

The process described above consists of first: provide a means to connect a towed vehicle to a towing vehicle in such a manner that each can essentially independently rotate laterally about their own local center of rotation in a manner such that the rotation of one does not force a rotational response of the other. And second: provide towed vehicle steering based on the constantly measured lateral angular deflections of the tow bar at both its forward and rear ends connections to the respective towing and towed vehicles. Further, the circular path of the towed vehicle is set by steering its front axle's wheels, or alternatively a front supporting dolly's wheels, proportionally to the angle between the centerline of the towed vehicle and a reference vector pointing to the towing vehicle's center of rotation.

In a preferred embodiment, three specific factors are used. Factor Kb provides the angular magnitude of a steering reference vector. Factor Ka offsets the circular path of the towed vehicle relative to that of the towing vehicle. And, factor Kc provides a correction to allow the aft pivot point of the tow bar to be offset either a short distance fore or aft of the center of the effective axle axis of the towed vehicle's steered front wheels. The three factors Ka, Kb, and Kc are utilized with the two measured tow bar deflection angles and, with the devised proportionality relationship of Eq. 4 to determine the specific steered angle of the towed vehicle's steered wheels as the vehicles are traveling.

Additionally, to help alleviate the negative aspect typical of fifth-wheel towed vehicles to significantly cut sharp city type corners, the Kb factor accurately simulates the fifth-wheel hitch location for tow bar lateral deflections up through approximately plus or minus 10 degrees from straight-ahead; and then as the tow bar's lateral deflection increases the virtual hitch point is moved gradually more rearward. This provides excellent fifth wheel stability for highway type speeds where the lateral deflections are normally less than +/−5 degrees and good stability on down to the 25 to 30 mph city speeds while providing a more rearward fifth-wheel simulation point for the much slower city cornering speeds.

A significant benefit of implementing embodiments of the present invention is that the fifth-wheel stability simulated for the higher speed range is traded somewhat for improved cornering at the corresponding much slower sharp corner speeds. In addition, the values of the Ka and Kc factors can be tailored to further improve the ability to maneuver the low speed sharp corners by adjusting dimensions of the geometry of a specific physical implementation.

Further, it is noted that the implementation of the procedures described herein, in many cases, can utilize an implicit tow bar as shown in some of the examples shown in FIGS. 5-7. That is, an arrangement can be utilized to virtually simulate a tow bar implementation, and for such an implied tow bar design, the above procedure utilizes the implied virtual tow bar's length.

BRIEF DESCRIPTION OF THE DRAWINGS

The accompanying drawings, which are incorporated in and constitute a part of the specification, illustrate the embodiments of the disclosure and, together with the general description of the disclosure given above and the detailed description of the drawings given below, serve to explain the principles of the disclosures. Various other advantages and features of novelty will become apparent as the description proceeds in conjunction with the accompanying drawings.

FIG. 7 is a top plan view of a further embodiment of the trailer steering apparatus of the present invention, showing a hydraulic emergency braking locking cylinders.

Figure 1:
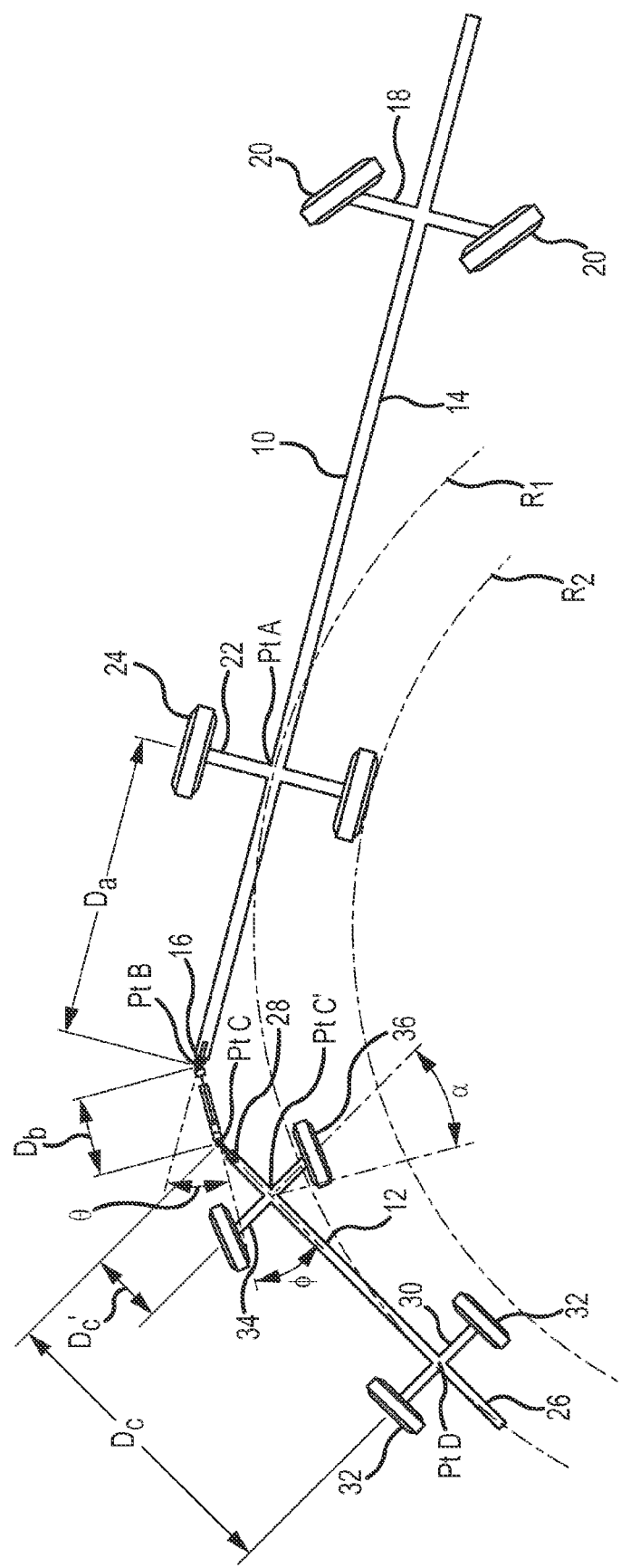
FIG. 1 is a simplified top plan view of one embodiment of a towing vehicle and towed vehicle incorporating a trailer steering apparatus of the present invention.

It should be understood that the drawings are not necessarily to scale. In certain instances, details that are not necessary for an understanding of the invention or that render other details difficult to perceive may have been omitted from these drawings. It should be understood, of course, that the invention is not limited to the particular embodiments illustrated in the drawings.

DETAILED DESCRIPTION

The following description will typically be with reference to specific structural embodiments and methods. It is to be understood that there is no intention to limit the invention to the specifically disclosed embodiments and methods, but that the invention may be practiced using other features, elements, methods and embodiments. Preferred embodiments are described to illustrate the present invention, not to limit its scope which is defined by the claims. Those of ordinary skill in the art will recognize a variety of equivalent variations on the description that follows. Like elements in various embodiments are commonly referred to with like reference numerals.

Several preferred methods have been devised to mechanically implement the above steering process.

FIG. 1 illustrates one example of a scenario where a towing vehicle 10 is pulling a towed vehicle 12. The frame of the towing vehicle is represented by a longitudinal axis 14 that extends the length of the towing vehicle and terminates at its rear end with a mounting shaft 16. The towing vehicle further includes a forward axle 18 with steerable wheels 20 located at the lateral end, and a rear axle 22 with fixed wheels 24 located at the lateral ends. The towed vehicle 12 similarly comprises a frame represented by a longitudinal axis 26 terminating at its forward end in a mounting shaft 28. In this embodiment, the towed vehicle 12 further comprises a rear axle 30 terminating at its lateral ends with fixed wheels 32, and a forward axle 34 terminating at its lateral end with steerable wheels 36. The towed vehicle may only have a single axle or it may have multiple axles. A steerable dolly may also be connected to the towed vehicle and used to steer the towed vehicle. Examples of towing dollies are the EZE-TOW dolly from Acme Trailer of Kernersville, N.C. and the Kar Kaddy models from Demco Manufacturing Co. of Boyden, Iowa. Other examples include U.S. Pat. Nos. 4,171,825, 5,477,937, 6,152,475, 7,134,829, 8,132,999, the entirety of each is incorporated herein by reference. In these various scenarios, the "active axle" for the towed vehicle is the steerable axle of the dolly. FIG. 1 further identifies and defines the points, distances and angles utilized in the equations and method steps described herein. As depicted in FIG. 1, the towing vehicle is making a turn of first arc or radius $R_1$, which extends through the intersection of the longitudinal axis and rear axle of the towing vehicle and very close to the center of the towed vehicle's rear axle. A second defined arc or radius $R_2$ depicts the resulting corner clearance for the towing vehicle and towed vehicle. Thus the towed vehicle will clear a corner obstruction if the towing vehicle clears the corner obstruction. As also depicted in FIG. 1, angle phi ($\phi$) is the instantaneous angular deflection of tow bar relative to longitudinal axis 26 of the towed vehicle. Angle theta ($\theta$) is the instantaneous angular deflection of tow bar relative to longitudinal axis 14 of towing vehicle. Angle alpha ($\alpha$) is the steered angle of the towed vehicle.

Figure 2:
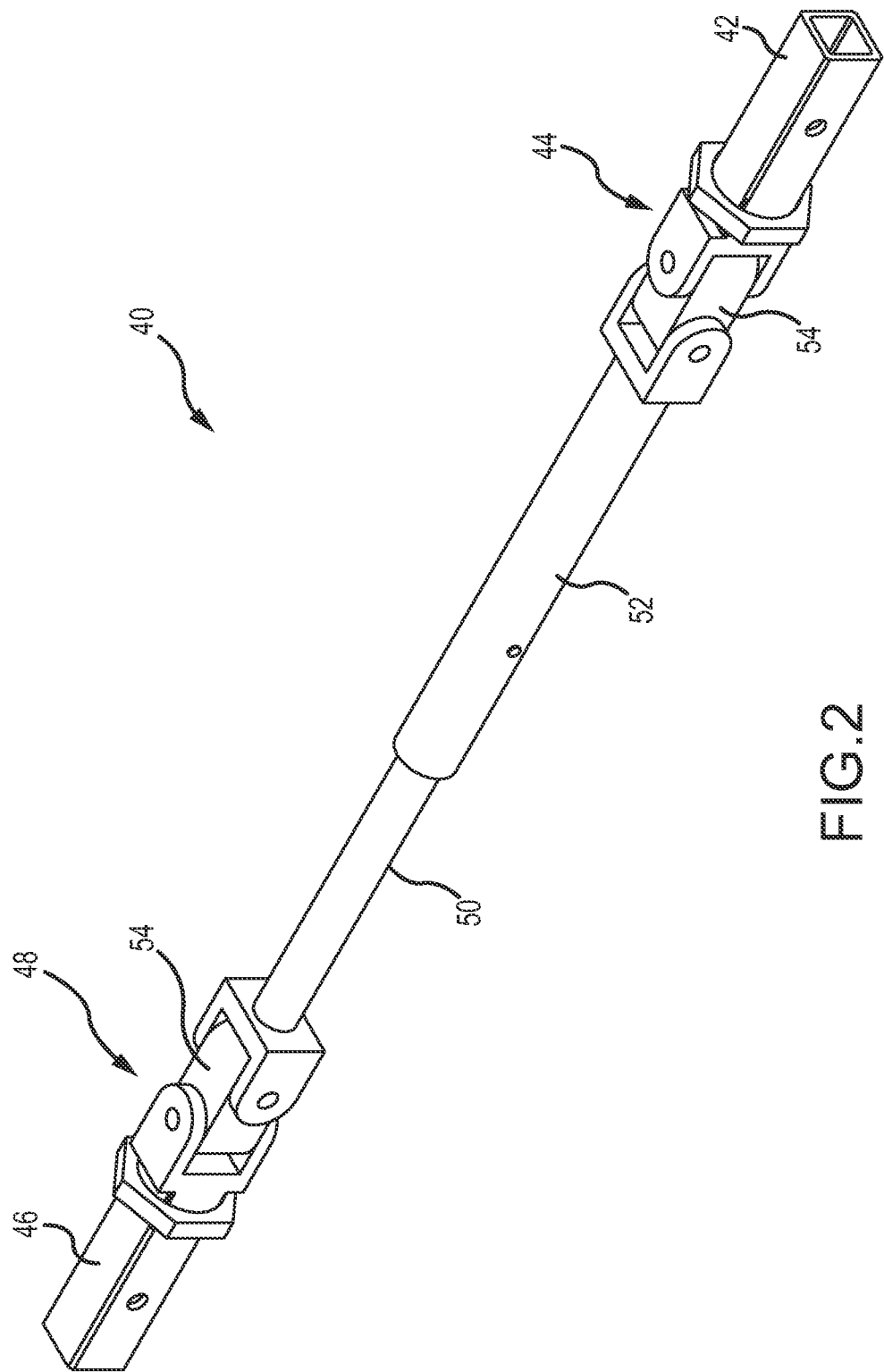
FIG. 2 is a perspective view of an embodiment of a trailer steering apparatus of the present invention.
Figure 3:
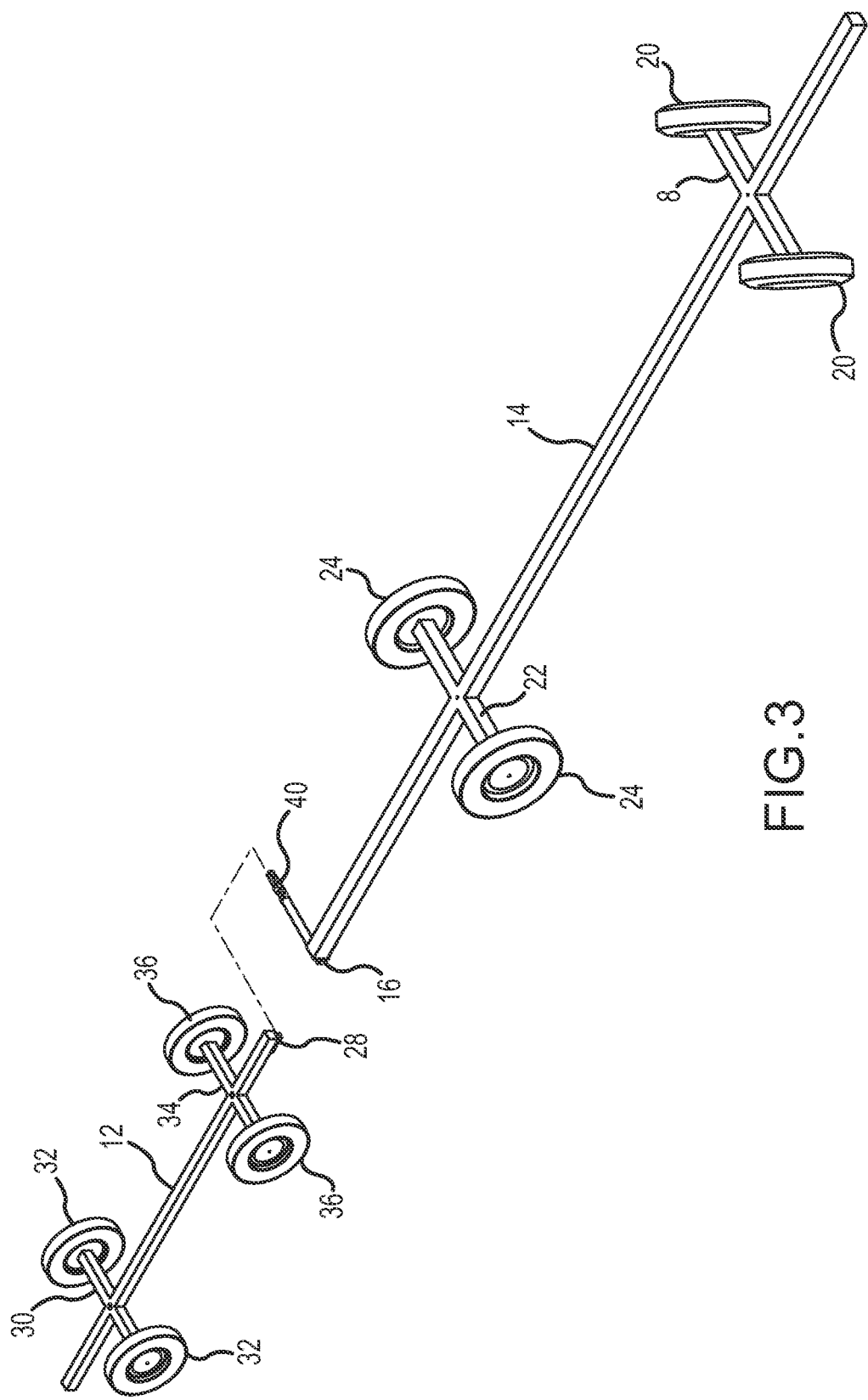
FIG. 3 is a perspective view of a simplified version of a towing vehicle and towed vehicle incorporating a trailer steering apparatus of the present invention.
Figure 4:
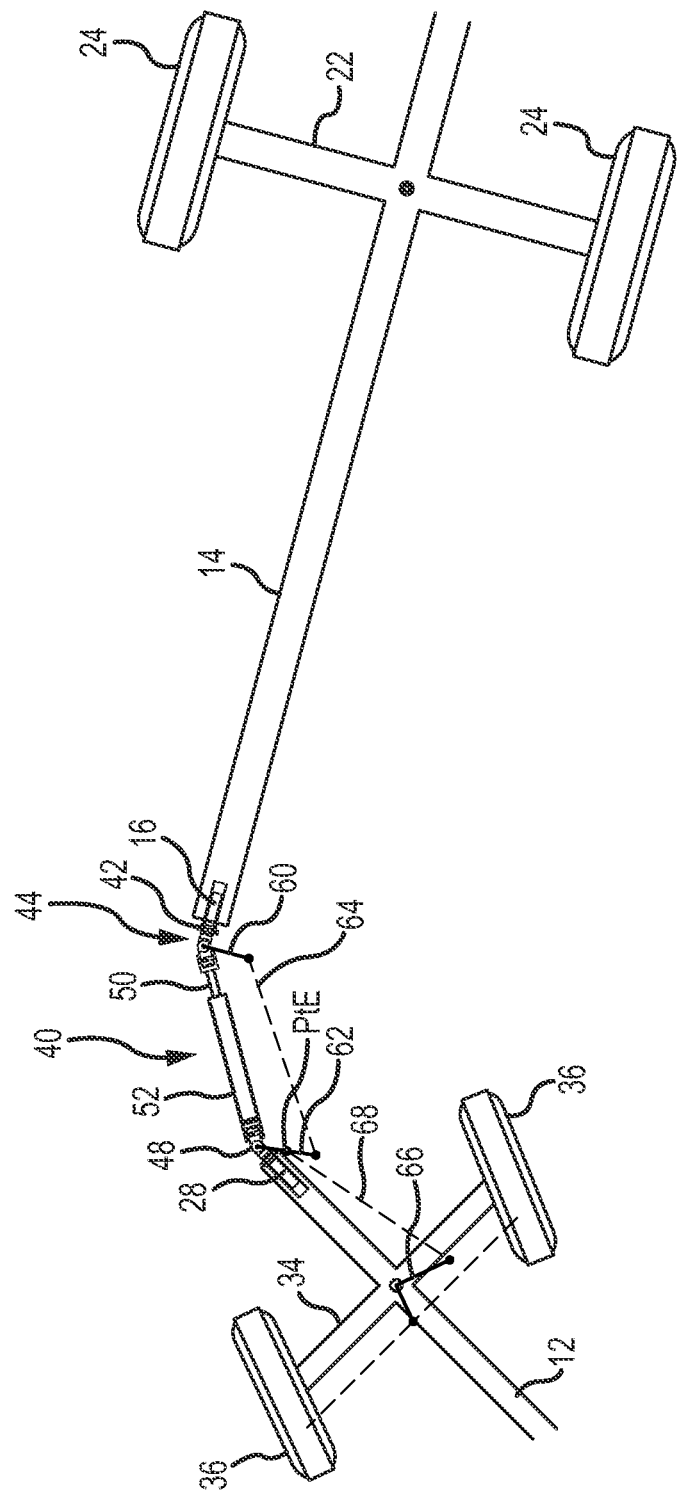
FIG. 4 is a top plan view of a simplified version of a towing vehicle and towed vehicle incorporating a further embodiment of the trailer steering apparatus of the present invention.

A first embodiment involves a computer driven servo mechanism for steering the towed vehicle. One implementation of the above steering process utilizes a tow bar 40 as shown in FIGS. 2-4 to provide the two lateral pivots defined above and the instantaneous values of the angles theta ($\theta$) and phi ($\phi$). The tow bar 40 comprises a mount 42 that connects to a mounting shaft 16 on the towing vehicle 10. A first joint 44 is connected to the mount 42 and permits lateral or pivoting movement in a generally horizontal plane to accommodate turning, as well as pivoting motion in a generally vertical plane to accommodate pitch. A similar mount 46 and joint 48 are located at the opposite end of the tow bar 40 and connect to the towed vehicle. A pair of concentrically oriented and telescoping tubes 50 and 52 interconnects joints 44 and 48. Tube 50 is positioned inside of outer tube 52. The relative position of the two tubes may be adjusted to vary the length of tow bar 40 during the process of hitching the two vehicles together and subsequently locked to fix its design length and can be additionally be locked or free in rotation depending on the design. In addition, an onboard computer, for example, in the form of a first and second angle encoders 54 are used to constantly calculate the required steering angle theta ($\theta$) and phi ($\phi$). The encoders 54 are mounted within the joints 44 and 48 and communicate with a servomechanism to steer the towed vehicle's wheels per equations 1 thru 4.

FIG. 4 illustrates one embodiment of a lever system to implement the towing system of the present invention. As illustrated, a first lever 60 is interconnected to the tow bar 40 at the connection with the towing vehicle. The lever 60 is in a fixed position perpendicular to the centerline of the towing vehicle. A second lever 62 is connected to the aft pivot 48 of the tow bar 40 and pivots freely relative to the tow bar. The distal ends of lever 60 and lever 62 are interconnected by a tie rod 64. The first lever 60 drives the position of the second lever 62 and the mechanical advantage between lever 60 and lever 62 is set to the factor Kb value. A third lever 66 is positioned at the intersection of the centerline 12 of the towed vehicle and the front axle 34 and is freely pivotable. The ratio between the lengths of lever 62 and lever 66 is set to the product factors Ka×Kc. A tie rod 68 interconnects the distal end of lever 66 with a point $Pt_E$ on lever 62 such that the mechanical advantage is Ka×Kc. The tow bar 40 and tie rod 64 are fixed length while towing, but can be extended during hitching for easy alignment. The location of $Pt_E$ is a function of both the towed and towing vehicles and could be made adjustable to accommodate switching towing vehicles for a given towed vehicle's hitch. The position of $Pt_E$ would then depend upon the distance Da of various potential towing vehicles. The ratio between levers 62 and 66, along with the lateral angular deflection of the towed vehicle relative to the tow bar 40, provide the equivalent of Ka×Kc to the drive lever's 66 deflection to the steer angle alpha.

Figure 5:
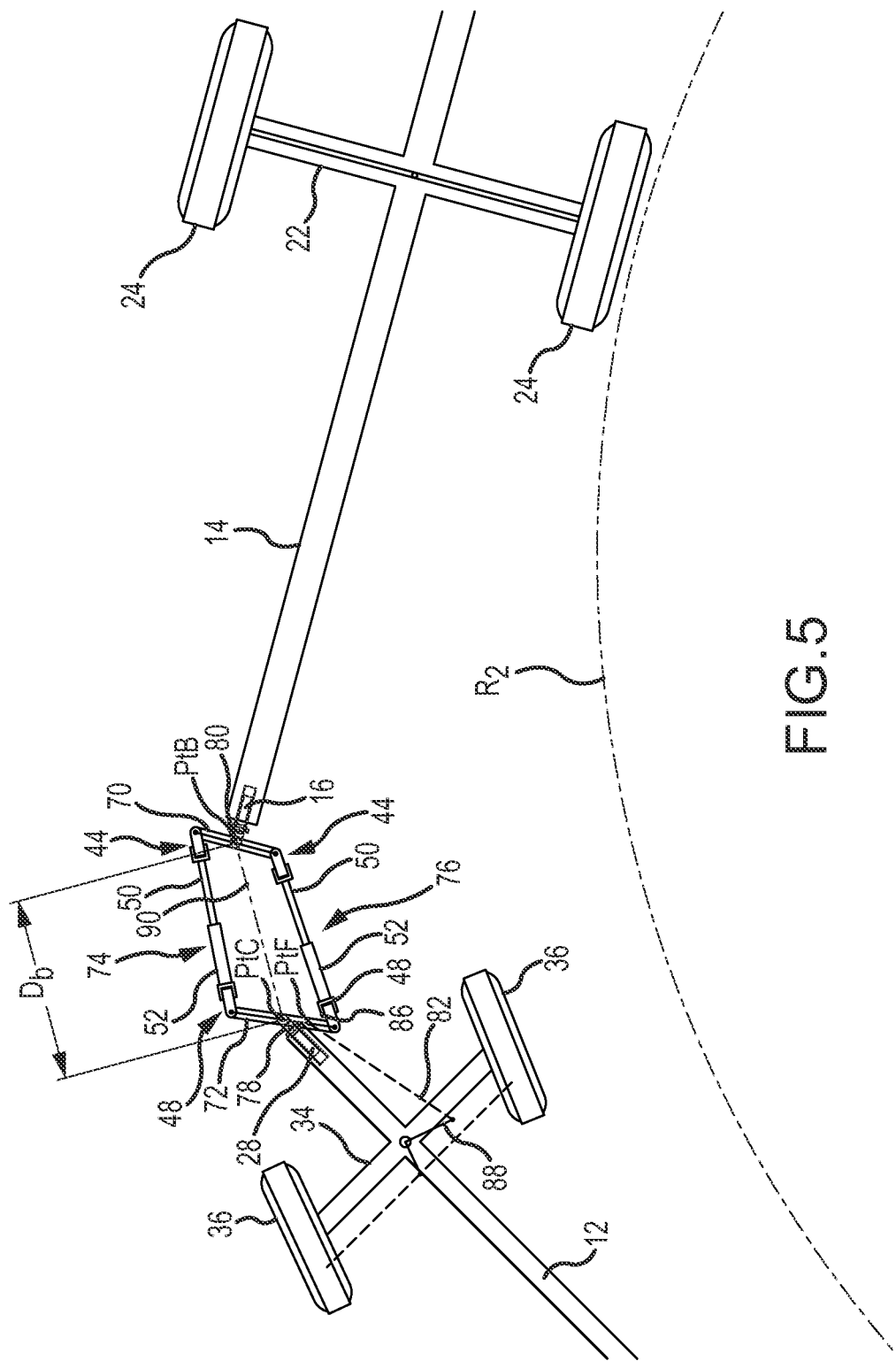
FIG. 5 is a top plan view of a simplified version of a towing vehicle and towed vehicle incorporating a further embodiment of the trailer steering apparatus of the present invention.

A four bar symmetrical system, as shown in FIG. 5, provides another version of the embodiment shown in FIG. 4 to implement the towing system of the present invention. The four bar linkage includes first lateral bar 70, a second lateral bar 72, a first tow bar 74 and a second tow bar 76. Lateral bar 70 is fixed relative to the towing vehicle to represent the towing vehicle's position. Lateral bar 72 is connected with a pivot 78 at its center ($Pt_C$) to the forward end of the towed vehicle's frame 12. The lengths of lateral bars 70 and 72 are selected with the ratio of their relative lengths equal to Kb such that the angular deflection of lateral bar 72 represents factor Kb. The tow bars 74 and 76 are at a fixed equal length while towing but can be extended during hitching for easy alignment. One embodiment of the tow bars 74 and 76 is illustrated in FIG. 2. The fixed length is determined by the length selected for the virtual tow bar 90 which must be suitable for the sharpest expected turning radius. Relief for twist between vehicles is not needed as the fore and aft sections of bars 74 and 76 can rotate relative to each other and bars are typically long enough to absorb inter-vehicle twist deflections. The length of the virtual tow bar for purpose of calculating Kb is measured from the center point $Pt_B$ of lateral bar 70 to the center point $Pt_C$ of lateral bar 72. However the virtual tow bar defined by these two bars now defines an elliptical path for $Pt_C$ versus the deflection of angle theta rather than the circular path for a fixed length bar at 90. This results in the Kb factor becoming a function of theta with at first very slow reduction in magnitude to maintain the desired stability for highway speeds and then progressively more so as the theta deflection approaches the ends of its elliptical travel for slow speed sharp corners. This effect can be adjusted as desired to trade lateral stability for cornering at the larger theta angles by changing the lengths of bars 70 and 72 while keeping their ratios set to Kb. A tie rod 82 interconnects the distal end point $Pt_F$ on lever 86 to lever 88 associated with the front axle 34 of the towed vehicle. Lever 86 is connected to the pivot located at the center 78 of the lateral bar 72 and pivots freely relative to the lateral bar 72. Lever 88 is positioned at the intersection of the centerline 12 of the towed vehicle and the front axle 34 and is freely pivotable. The mechanical advantage between levers 86 and 88 is set by selecting the ratio of the radii to point $Pt_F$ to the length of lever 88 equal to Ka×Kc. Then the combined deflections of lever 86 and the centerline 12 of the towed vehicle relative to the centerline 90 of the virtual tow-bar will deflect lever 88 to steer the towed vehicle's front wheels to the steer angle alpha ($\alpha$). The location of $Pt_F$ is a function of both the towed and towing vehicles and could be made adjustable to accommodate switching towing vehicles for a given towed vehicle's hitch. The position of $Pt_F$ would then depend upon the distance Da of various potential towing vehicles.

Figure 6A:
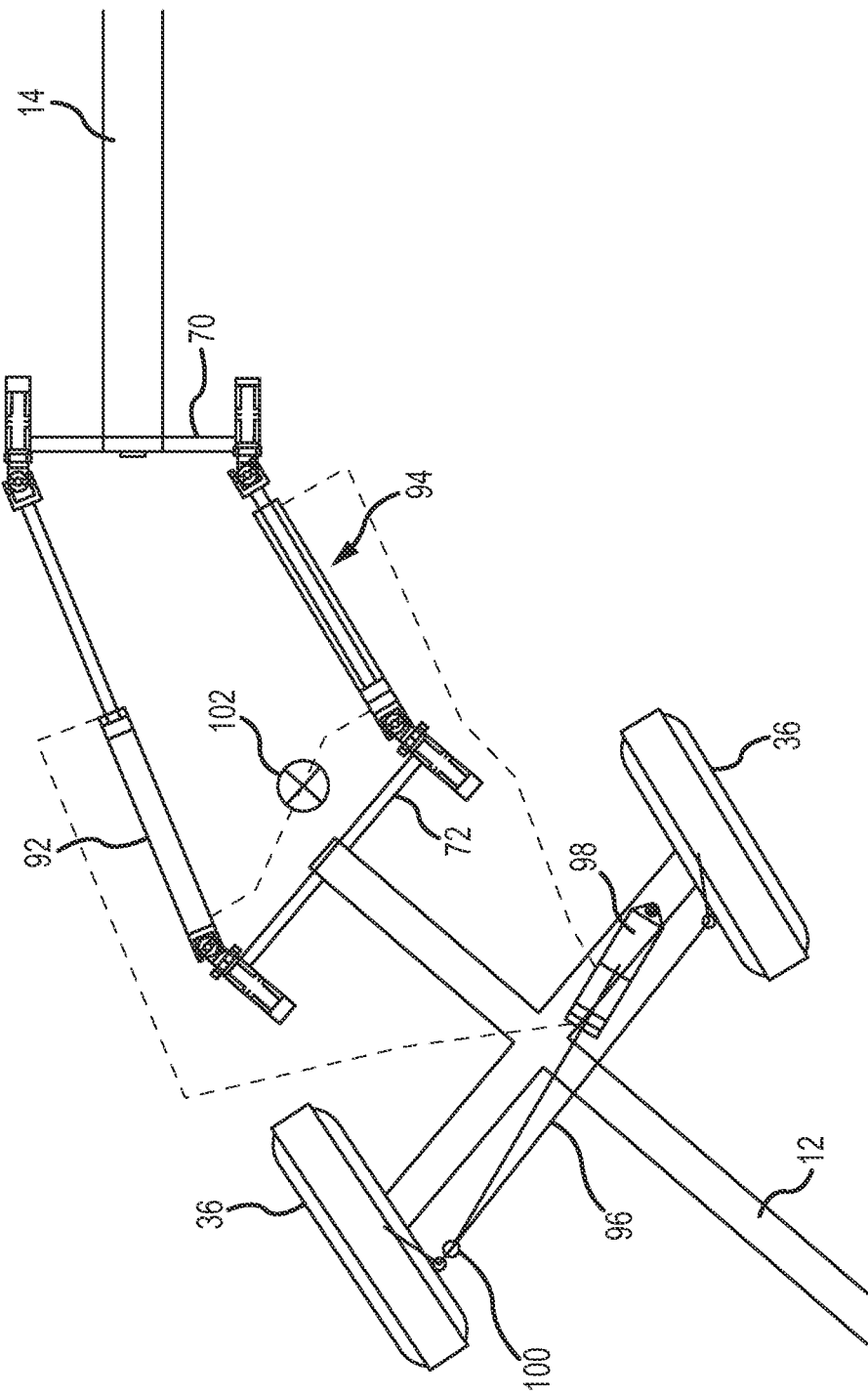
FIG. 6A is a top plan view of a simplified version of a towing vehicle and towed vehicle incorporating a further embodiment of the trailer steering apparatus of the present invention.

The mechanical four bar linkage of FIG. 5 can be emulated hydraulically with the tow-bars 74 and 76 replaced with hydraulic cylinders 92 and 94 as shown in FIG. 6A. Here lateral bar 70 represents the towing frame at center point $Pt_B$ and lateral bar 72 represents the towed frame at center point $Pt_C$. The two cylinders 92 and 94 are of equal diameters and plumbed such that the sum of their lengths is a constant. Then their relative deflections will provide hydraulic liquid flow volume between cylinders representing the Kb*theta portion of the fifth wheel vector input based on the ratio of the lengths of lateral bars 70 and 72; and the effective rotational deflection of bar 72 being attached to the towed vehicle's frame adds the value of phi similarly as for the fixed bar embodiment of FIG. 4. A tie rod 96 interconnects the steered wheels 36 of the towed vehicle to which the driving end of the steering cylinder 98 is connected at point 100. Hydraulic fluid is applied to the cylinders 92, 94 and 98 by hydraulic lines using methods and structures known to those of skill in the art. Dimension $D_b$ of the virtual tow bar used to calculate Kb is defined in FIG. 5 as the distance between the center points of lateral bars $Pt_C$ and $Pt_B$ and also follows an elliptical path as described for FIG. 5. The flow between the two cylinders 92 and 94 is plumbed to a third or steering cylinder 98 to drive the steered wheels 36. The three cylinders and their piston rod's diameters are selected to provide a mechanical advantage equal to Ka×Kc which along with volume of fluid movement between cylinders 92 & 94, as defined above, to drive cylinder 98 to provide the desired steer angle alpha. This can be accomplished by setting the ratio of the cross sectional wetted areas of cylinder 92 and 94, on the rod end side, each to the cross sectional wetted area of the drive cylinder 98 to the Ka×Kc value, where cylinder 98 is symmetrical having the same wetted area on either side of its piston.

Thus the hydraulic tow-bar system shown in FIG. 6A can be utilized to implement essentially the same analog implementation of the design factors Ka, Kb and Kc as the fixed length mechanical lever system shown in FIG. 5. The hydraulic version provides the advantage of eliminating the need for physical linkage connections on the towed vehicle between the forward tow-bar pivot point or center point $Pt_C$ back to its steered axle by transferring the lever deflection data hydraulically.

In addition, the hydraulic system has the advantage that by utilizing remote control of various valves the system can be altered while in operation to provide numerous safeties and control functions.

As a safety feature in the event of maximum-emergency-braking, the flow between the two fore and aft drive cylinders 92 and 94 are blocked with a valve 102. Locking these two cylinders effectively locks out the transfer of the fifth wheel stability from $Pt_A$ on the towing vehicle to $Pt_C$. For example if the emergency occurred when the vehicles were close to proceeding straight ahead at highway speeds the towed vehicle would essentially be pointed at the desirable normal fifth wheel hitch point and when the cylinders are locked it would tow as though it were actually hitched at that point but with its wheel base effectively increased by the distance Da plus Db. Thus the towed vehicle would for the emergency locked case be significantly more stabile with less jackknifing effect on the towing vehicle as if it was connected with an extended tow bar from $Pt_A$ to $Pt_B$. And furthermore in this emergency configuration the towed vehicle can still laterally deflect hitch-wise about the original fifth wheel pivot point $Pt_A$ such that the towing vehicle is not restricted from being maneuvered for the small angles that would be utilized at highway speeds while the emergency lock is in effect. Thus during the emergency locked state the towed vehicle is considerably more stable than for its original physical state and will have less degrading effect on the towing vehicle during the emergency. This will impede the virtual tow bar linkage from jackknifing and tend to hold the vehicles in their relative line when the emergency was activated while still allowing a significant degree of un-impeded maneuvering of the towing vehicle. Conversely opening this valve will release them for maneuvering whenever the emergency braking is relieved.

Figure 6B:
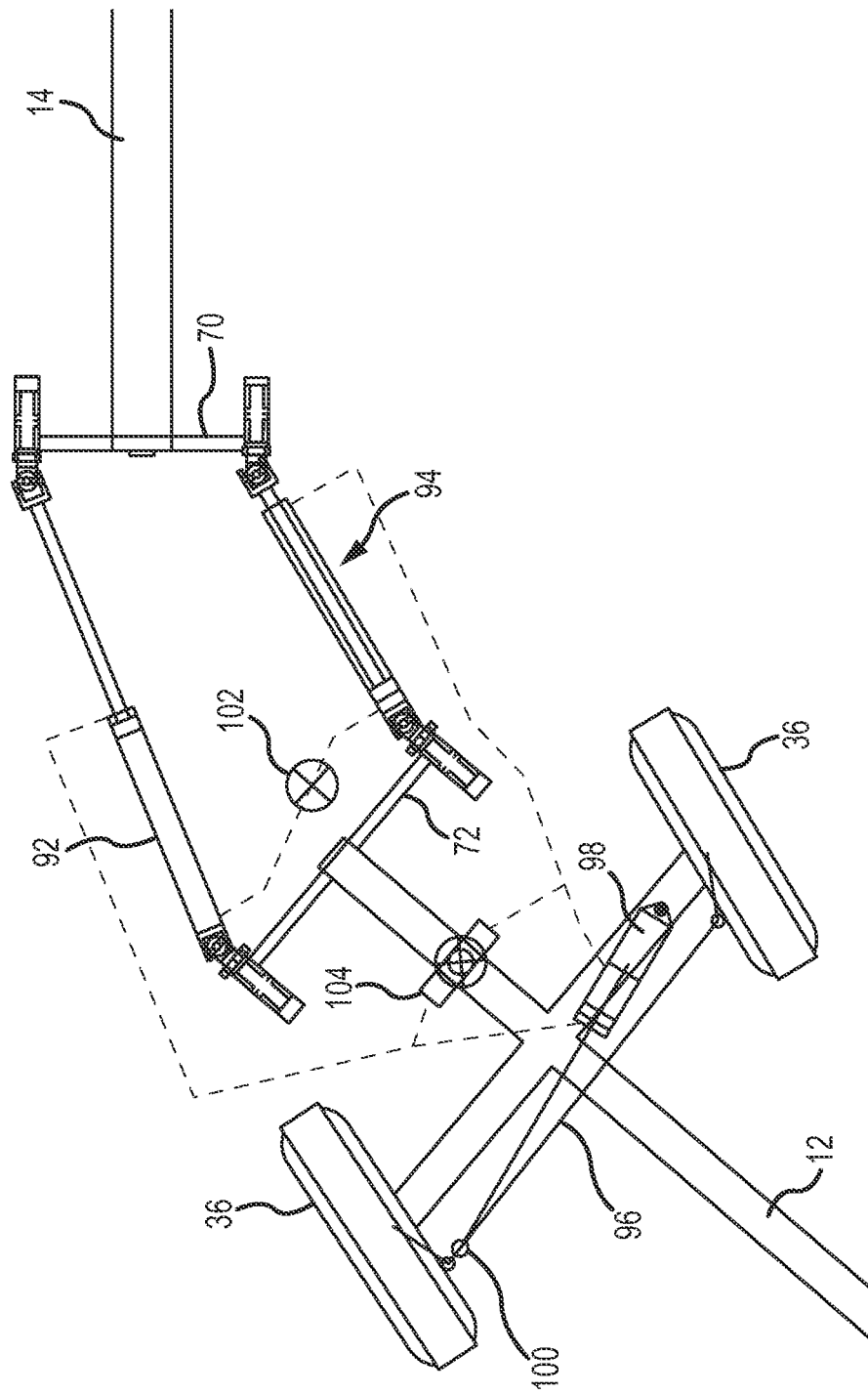
FIG. 6B is a top plan view of an alternative to the embodiment of FIG. 6A.

As an additional option, as shown in FIG. 6B, control features can be implemented to the embodiment of FIG. 6A by adding a hydraulic pump 104 to transfer hydraulic fluid from either the right or left-side lines on the steering cylinder 98 to the respective opposite side to adjust the lateral alignment of the towed vehicle with respect to the towing vehicle/ or as an off-set to the normal linkage driven steering while the vehicles are in operation. This is also useful as an aide when maneuvering a difficult corner or when backing-up or parking.

Additional emergency stability beyond that of closing valve 102 can be provided by adding two cylinders 106 and 108, one from each end of lateral bar 72 (representing the towed frame) to the center $Pt_B$ of lateral bar 70 (representing the towing frame). One example of such an embodiment is illustrated in FIG. 7. These cylinders 106 and 108 are plumbed to be normally free to deflect but in the event of a critical emergency locked by closing their valve 110 along with valve 102. This would totally lock the towing vehicle, the virtual tow bar and the towed vehicle all in their relative positions at the time of the emergency such that the entire group would not jackknife and tend to slide with less violent rotation.

These locking valves 102 and 108 would be fast acting motor driven so they could be locked and freed on command to provide periods to maneuver between maximum braking.

Relative to sharp city type cornering, the factor Ka is designed to shift the circular path of the towed vehicle outwardly to a greater radius to be more directly behind the towing vehicle than it would be for merely steering it to point to the normal fifth-wheel hitch location. This factor is towed-vehicle-wheel-base Dc and towing vehicle over hang Da dependent and moves the path of the rear axle for a towed vehicle to essentially coincide with the track of the rear wheels of the towing vehicle when Dc is equal to or less than Da and for somewhat longer Dc values for towed vehicles narrower than the towing vehicle. With this factor the towed vehicle's wheel base is effectively maintained at its original length as connected to the normal towed rear axle location. Thus its wheel base remains unchanged and its turn radius is equal or slightly greater (better). This by itself essentially eliminates the corner cutting for such towed vehicles because the towed vehicle will clear whatever the towing vehicle clears. However this improvement subsides exponentially as the towing vehicle's turning radius approaches the towed vehicle's wheel-base. Where the turn angle of the towed vehicle relative to the towing vehicle is 90 degrees the towed rear wheels merely pivot about a point. This is the sharpest turning radius limit for a fifth wheel trailer. Thus corner clearance for relatively short towed vehicles for the proposed hitch is excellent but, with an increasing towed vehicle wheel base, becomes similar to that of a traditional fifth wheel trailer hitched at PtA to the towing vehicle. The cornering advantage of the proposed system can be increased through the use of dimension c' to set back the front steered wheels axle of the towed vehicle. However this is limited since shortening the towed vehicle's wheel base decreases its stability.

The Kb factor is used to provide a reference for the direction to steer the towed vehicle to mimic the path of the local rotational center of the towing vehicle; which is the only point on the towing vehicle that does not reflect the transient steering rotations of the towing vehicle. In this specific manner, the towed vehicle is thereby isolated from the detrimental rotational gyrations of a towing vehicle whenever the driver changes its path's radius. The Kb expression was derived to provide essentially perfect virtual simulation for tow bar lateral angular deflections up to about 10 degrees and then begin to drop off to indicate more rearward virtual hitch points. Thus the mandatory slowing down for sharp corners makes it acceptable to trade-off the fifth-wheel stability for cornering improvement on the basis of the value of the tow bar deflection, angle theta. In addition, this theta relation also sets it back for high speed as the theta value subsequently decreases. Thus the fifth-wheel location trade-off for improved cornering is a smooth transition preserving towed vehicle stability down to corner turning speeds built into the definition for Kb and becomes automatic based on the present instantaneous turn angle theta.

The Kc factor also provides another virtual hitch point option in that it can be used to effectively decrease the towed vehicle's wheel-base which can allow the towed vehicle to turn more sharply; and can be used to improve the towed vehicle's corner clearance.

Factor Kb is used to provide a reference angular direction to the ideal fifth-wheel hitch position, which for a front-steered towing vehicle is the center of its rear axle. With the tow bar's two angular values, theta and phi, and the geometric dimensions Da, Db, Dc and Dc', the virtual path of the towed vehicle is as if it were actually connected at the towing vehicle's local center of rotation and is determined and translated effectively to the rear of the tow bar, Pt C, to steer the towed vehicle from that point. This is done with the instantaneously measured angles theta and phi, along with the factors Ka and Kc. The factor Ka provides the path translation and Kc allows the steered axle to be off-set somewhat forward or rearward from Pt C. It is significant to note that the Ka factor does not merely provide an extension of a fifth wheel trailer from the normal fifth-wheel hitch-point, but essentially relocates the towed vehicle with that path from the normal towing vehicle rear axle point to the new similarly stable virtual hitch-point at Pt C at the end of the tow bar.

The result is that the path of the original hitch point at the towing vehicle's rear axle is essentially replicated at Pt C to provide the new virtual center about which the towed vehicle's rear wheels track. The effective wheel-base of the towed vehicle is not merely extended to clear the towing vehicle; but the normal fifth-wheel stable hitch point is re-created at Pt C at approximately its original radius at $Pt_A$. And the towed vehicle essentially follows the path that it would have if it were hitched at the towing vehicle's normal rear axle point. In addition the stability of true fifth-wheel stability is maintained from straight travel on down to sharper city type turning radii with no abrupt changes in handling characteristics.

Thus the proposed embodiments and methods described herein provide means to stabilize a rear hitched towed vehicle by freeing the lateral rotational connection between the two vehicles by utilizing either an actual or implicit tow bar pivoting at the connections to both vehicles; and to utilize the magnitude of the lateral angular deflection of both vehicles relative to the tow bar to steer the laterally freed towed vehicle with the use of three specific factors which: a) virtually simulate the stable path of a fifth-wheel hitched vehicle; b) offset the stabilized circular path of the towed vehicle to a more favorable larger radius behind the towing vehicle; and, c) provide true fifth-wheel simulation at speeds where it is needed while trading-off somewhat the fifth-wheel stability for improved maneuvering at the very slow speeds associated with sharp city corners and parking lots. This process essentially provides the advantages of both rear mounted and fifth-wheel type hitches while eliminating or significantly minimizing their disadvantages.

Thus the proposed embodiments accomplish both the objective of providing the stability of fifth wheel towing without being physically attached at the typical present fifth wheel hitch location along with the advantage of in many cases reducing the towed vehicle's effective wheel base. And, with the practicality of utilizing many various steering mechanisms and control features with the simplicity of a reliable, safe and simple tow bar or at most a virtual tow bar.

It is therefore to be understood that while different embodiments are herein set forth and described, the above and other modifications and changes may be made in the construction and arrangement of elements as well as intended use of the apparatus without departing from the spirit and scope thereof. Indeed, it will be readily appreciated by those of skill in the art upon review of the present disclosure that the methods of embodiments of the present invention may be implemented with a wide variety of apparatus.

Thus the proposed process provides a practical and relatively simple process to transpose the typical stable track of a fifth wheel towed vehicle to a towed vehicle attached at the rear of a towing vehicle with a variety of steering system hardware. The proposed procedure can be implemented with levers, gears, belts and pulleys, hydraulic cylinders computerized power steering, etc. But all depend on independently steering the towed vehicle; the ability to sense the change in the towing vehicle's path radius; and to allow and steer the towed vehicle to gradually asymptotically merge its radial path to the center of changes in the towing vehicle's radial path as those changes are incurred. And, the proposed embodiments and methods do this with a combination of a both ends hinged tow bar, actual or implicit; the use of a steerable axle or dolly; and the measuring of two angles; with three simple geometric hardware dependant factors.

Although the preferred embodiments of present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims. Moreover, though the description of the invention has included description of one or more embodiments and certain variations and modifications, other variations, combinations, and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The present invention, in various embodiments, includes components, methods, processes, systems and/or apparatus substantially as depicted and described herein, including various embodiments, sub combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

What is claimed is:

1. A method for steering a towed vehicle, where a towing vehicle has a center axis extending the length of the towing vehicle and at least a front axle and rear axle, and the towed vehicle has a center axis extending the length of the towed vehicle and at least a front axle with steerable wheels and a rear axle, a first hitch point is secured to the towing vehicle at a position on the center axis of the towing vehicle and rearward of the rear axle of the towing vehicle, and a second hitch point is secured to the towed vehicle at a position on the center axis of the towed vehicle and forward of the front axle of the towed vehicle, the method comprising:
 a. providing a tow bar having a first end and a second end;
 b. connecting the first end of the tow bar to the first hitch point, wherein the first end of the tow bar pivots horizontally and vertically relative to the first hitch point;
 c. connecting the second end of the tow bar to the second hitch point, wherein the second end of the tow bar pivots horizontally and vertically relative to the second hitch point;
 d. determining a first factor, where the first factor is the result of 1−a/(a+c), where a is the distance between the rear axle of the towing vehicle and the first hitch point, and c is the distance between the rear axle of the towed vehicle and the second hitch point;
 e. determining a second factor, where the second factor is the result of a/(a+b), where a is the distance between the rear axle of the towing vehicle and the first hitch point, and b is the distance between the first and second hitch points;
 f. determining a third factor, where the third factor is the result of (c−c')/c, where c is the distance between the rear axle of the towed vehicle and the second hitch point of the towed vehicle and c' is the distance between the front axle of the towed vehicle and the second hitch point;
 g. associating an encoder with the first end of the tow bar and using the encoder to measure a first angle between the center axis of the towing vehicle and a line interconnecting the first and second hitch points;
 h. associating an encoder with the second end of the tow bar and using the encoder to measure a second angle between the center axis of the towed vehicle and the line interconnecting the first and second hitch points; and
 i. inputting data to a servomechanism to steer at least the steerable wheels associated with the front axle of the towed vehicle at a third angle, where the third angle is the result of the following equation: the first factor×the third factor×(the second angle+(the second factor×the first angle)).

2. The method of claim 1, wherein the length of the tow bar is adjustable.

3. A method for steering a towed vehicle being pulled by a towing vehicle, where the towing vehicle has a center axis extending the length of the towing vehicle, a front axle with at least one steerable wheel positioned at each end of the front axle, a rear axle with at least one non-steerable wheel positioned at each end of the rear axle, and where the towed vehicle has a center axis extending the length of the towed vehicle and at least two axles spaced fore and aft along the center axis of the towed vehicle to form a substantially stable fore and aft wheel base and with at least one axle having laterally spaced wheels to provide lateral vertical stability and at least the fore located axle having a steerable wheel or wheels, the method comprising:
 a. providing a tow bar having a first end and a second end;
 b. interconnecting the first end of the tow bar to a first hitch point secured to the towing vehicle at a position proximate the center axis of the towing vehicle and rearward of the rear axle of the towing vehicle, and wherein the first end of the tow bar pivots horizontally relative to the center axis of the towing vehicle;
 c. interconnecting the second end of the tow bar to a second hitch point secured to the towed vehicle at a position proximate the center axis of the towed vehicle and proximate or forward of the front axle of the towed vehicle, and wherein the second end of the tow bar pivots horizontally relative to the center axis of the towing vehicle;
 d. determining a first factor associated with oscillation in the towing vehicle;
 e. determining a second factor associated with offsetting the path of the towed vehicle;
 f. determining a third factor associated with location of the second hitch point relative to the at least one axle having a steerable wheel or wheels;
 g. measuring a first angle between the center axis of the towing vehicle and a line interconnecting the first and second hitch points;
 h. measuring a second angle between the center axis of the towed vehicle and the line interconnecting the first and second hitch points;
 i. inputting data to a servomechanism to steer the steerable wheel or wheels on at least the fore located axle on the towed vehicle to track a turning radius according to the following equation: the first factor×the third factor×(the second angle+(the second factor×the first angle)).

4. The method of claim 3, wherein the length of the tow bar is adjustable.

5. The method of claim 3, wherein a first encoder is used to measure the first angle and a second encoder is used to measure the second angle.

6. The method of claim 3, wherein the first factor is the result of 1−a/(a+c), where a is the distance between the rear axle of the towing vehicle and the first hitch point, and c is the distance between the rear axle of the towed vehicle and the second hitch point.

7. The method of claim 3, wherein the second factor is the result of a/(a+b), where a is the distance between the rear axle of the towing vehicle and the first hitch point, and b is the distance between the first and second hitch points.

* * * * *